United States Patent [19]

Abe et al.

[11] Patent Number: 5,422,419
[45] Date of Patent: Jun. 6, 1995

[54] AGENT FOR ALIGNMENT TREATMENT FOR A LIQUID CRYSTAL CELL

[75] Inventors: Toyohiko Abe; Makoto Mishina, both of Funabashi, Japan

[73] Assignee: Nissan Chemical Indstries Ltd., Tokyo, Japan

[21] Appl. No.: 115,544

[22] Filed: Sep. 3, 1993

[30] Foreign Application Priority Data

Sep. 7, 1992 [JP] Japan ................................. 4-238354

[51] Int. Cl.$^6$ ............................................. C08G 73/10
[52] U.S. Cl. ................................. 528/342; 528/336; 528/351; 528/353; 428/1; 428/473.5
[58] Field of Search ................. 528/342, 336, 351, 353; 428/1, 473.4

[56] References Cited

U.S. PATENT DOCUMENTS

| | | | |
|---|---|---|---|
| Re. 33,342 | 6/1988 | Kohtoh et al. | |
| 3,763,114 | 10/1973 | Saluti | 528/336 |
| 4,042,571 | 8/1977 | Kawase et al. | 528/336 |
| 4,929,658 | 5/1990 | Kohtoh et al. | |
| 5,059,677 | 10/1991 | Kohtoh et al. | 528/353 |
| 5,070,182 | 12/1991 | Kohtoh et al. | |
| 5,111,318 | 5/1992 | Kohtoh et al. | |

FOREIGN PATENT DOCUMENTS

| | | |
|---|---|---|
| 0249881 | 12/1987 | European Pat. Off. . |
| 0323644 | 7/1989 | European Pat. Off. . |
| 0503918 | 9/1992 | European Pat. Off. . |

OTHER PUBLICATIONS

Molecular Crystals and Liquid Crystals, vol. 163, Oct. 1988, H. Fukuro, et al., "Newly Synthesized Polyimide for Aligning Nematic Liquid Crystals Accompanying High Pretilt Angles", pp. 157–162.

Database WPI, Derwent Publications Ltd., AN 91–012548, JP–A–2 287 324, Nov. 27, 1990.

*Primary Examiner*—John Kight, III
*Assistant Examiner*—P. Hampton-Hightower
*Attorney, Agent, or Firm*—Oblon, Spivak, McClelland, Maier & Neustadt

[57] ABSTRACT

An agent for alignment treatment for a liquid crystal cell, which comprises an organic solvent-soluble polyimide obtained by reacting and polymerizing a tetracarboxylic acid component with a diamine component and a dicarboxylic acid component containing a long chain alkyl group and/or a monoamine component containing a long chain alkyl group, followed by imide-formation.

17 Claims, No Drawings

AGENT FOR ALIGNMENT TREATMENT FOR A LIQUID CRYSTAL CELL

The present invention relates to an agent for alignment treatment for a liquid crystal cell. More particularly, it relates to an agent for alignment treatment for a liquid crystal cell, whereby low temperature heat treatment is possible and yet liquid crystal molecules have a stable high tilt angle against a substrate.

Liquid crystal cells are display devices utilizing electrooptical changes of liquid crystal, and they are small in size and light in weight and have an attractive characteristic such that power consumption is small. In recent years, they have found remarkable developments as display devices for various displays.

Among them, a typical representative is a twisted nematic (TN) electric field effect type liquid crystal cell employing a nematic liquid crystal having a positive dielectric anisotropy, wherein liquid crystal molecules are aligned in parallel with a pair of mutually facing electrode-substrates at the respective interfaces and the two substrates are assembled so that the aligned directions of the respective liquid crystal molecules cross each other.

For a TN liquid crystal cell of this type, it is important to uniformly align the long axis direction of liquid crystal molecules in parallel with the substrate surface.

Heretofore, the following two methods have been known as typical methods for aligning liquid crystals.

The first method is a method wherein an inorganic film is formed on a substrate by-vapor-depositing an inorganic substance such as silicon oxide obliquely to the substrate so that liquid crystal molecules are aligned in the direction of vapor deposition. This method is not industrially efficient, although uniform alignment can be thereby obtained.

The second method is a method in which an organic coating film is formed on a substrate surface, and the surface thereof is rubbed in a predetermined direction with a cloth of e.g. cotton, nylon or polyester, so that liquid crystal molecules will be aligned in the rubbing direction. By this method, uniform alignment can be obtained relatively easily. Therefore, this method is most commonly used on an industrial scale. For the organic film, a polyvinyl alcohol, a polyoxyethylene, a polyamide or a polyimide may, for example, be used. Among them, a polyimide is most commonly used from the viewpoint of the chemical stability, thermal stability, etc.

Although the polyimide is commonly used as a liquid crystal alignment film, it has a drawback that the solubility in an organic solvent is extremely poor. Accordingly, in order to form a polyimide coating film on a substrate, it is common to employ a method wherein a solution of a polyimide precursor (hereinafter referred to as a polyamic acid) is prepared, and the solution is then coated on a substrate, followed by heating to convert the polyamic acid to a polyimide. However, to convert the polyamic acid to the polyimide, heat treatment at a high temperature of at least 170° C. is required. Such high temperature heat treatment is not only disadvantageous from the viewpoint of the process but also brings about a deterioration of the display quality of the liquid crystal cell such that the glass substrate undergoes warping to impair the uniformity of the alignment.

Further, in addition to usual glass substrates, various substrates have recently been developed including the one wherein a plastic film substrate made of e.g. polyethylene terephthalate (PET) is used, the one wherein an active element so-called TFT is provided on a glass substrate, and the one wherein a color filter layer is formed on a substrate for liquid crystal color display. Such substrates have poor heat resistance, and they are not durable to the high temperature for conversion of the polyamic acid to the polyimide, whereby it has been difficult to form a uniform coating film of polyimide.

In a case of a substrate having such poor heat resistance, it has been common to use it by subjecting it to heat treatment at a temperature lower than the heat resistant temperature of the substrate. However, in such a case, there has been a problem in the durability of the cell, since the conversion of the polyamic acid to the polyimide is inadequate.

On the other hand, a method is also known wherein the molecular structure of the polyimide is modified to obtain a polyimide which is soluble in an organic solvent, and a solution of such a polyimide is coated on a substrate, whereupon the solvent is simply evaporated to form a polyimide coating film at a relatively low temperature.

However, reflecting the trend in recent years for high densification and high chromatic precision of the liquid cell display, the requirements for uniformity of alignment have been increasingly severe. For example, in a case of a STN (super twisted nematic) mode, a stable high tilt angle is important. And, this is a factor which is concerned largely with the properties of the alignment film, and the properties of the alignment film is one of important factors influential over the display quality of the liquid crystal cell.

In a case of conventional solvent-soluble polyimides, uniform alignment may be obtained by low temperature heat treatment, but with respect to the desirability for a stable high tilt angle, the results have not necessarily been adequate and have been inferior as compared with the results obtained by high temperature heat-treated alignment films. Accordingly, there has been a serious problem from the viewpoint of accomplishing a display of high quality.

The present inventors have conducted extensive studies to solve the above problems and as a result, have accomplished the present invention.

Thus, the present invention provides:

(1) An agent for alignment treatment for a liquid crystal cell, which comprises an organic solvent-soluble polyimide obtained by reacting and polymerizing a tetracarboxylic acid component with a diamine component and a dicarboxylic acid component containing a long chain alkyl group and/or a monoamine component containing a long chain alkyl group, followed by imide-formation;

(2) The agent for alignment treatment for a liquid crystal cell according to the above (1), wherein at least 10 mol % of the diamine component is selected from the group consisting of:

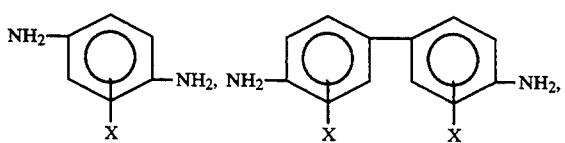

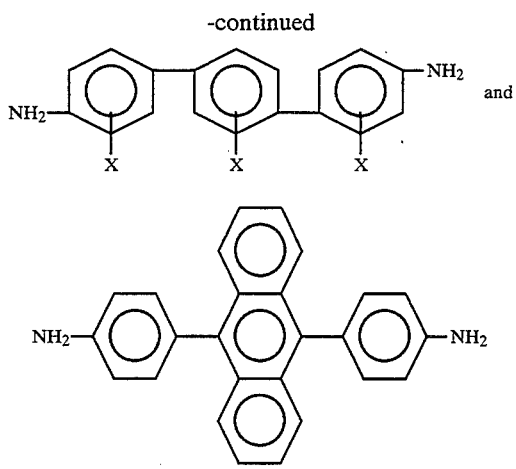

wherein X is a hydrogen atom, an alkyl group, an acyl group, an alkoxy group or a halogen atom; and (3) The agent for alignment treatment for a liquid crystal cell according to the above (1), wherein the tetracarboxylic acid component is 3,4-dicarboxy-1,2,3,4-tetrahydro-1-naphthalene succinic dianhydride.

The alignment film of the present invention is made of an organic solvent-soluble polyimide resin having the specific structure. Such a polyimide resin is dissolved in an organic polar solvent such as N-methylpyrrolidone, N,N-dimethylacetamide, N,N-dimethylformamide or γ-butylolactone, to obtain a polyimide resin solution, which is then coated on a transparent substrate such as a glass substrate or a plastic film, provided with a transparent electrode, followed by heat treatment at a relatively low temperature at a level sufficient to evaporate the solvent, to form a polyimide resin film, which is then subjected to rubbing treatment to obtain a liquid crystal alignment film.

The liquid crystal alignment film of the present invention does not require high temperature heat treatment for forming a polyimide resin film and is thus useful even for a liquid crystal cell employing a substrate which is inferior in the heat resistance. Further, in the alignment film, the liquid crystal molecules have a stable high tilt angle against the substrate.

The long chain alkyl group in the dicarboxylic acid component containing a long chain alkyl group or in the monoamine component containing a long chain alkyl group, to be used in the present invention, is not particularly limited, but is preferably a $C_{8-22}$ linear alkyl group, more preferably a $C_{12-18}$ linear alkyl group.

The tetracarboxylic acid component constituting the organic solvent-soluble polyimide of the present invention is not particularly limited, so long as it does not impair the solubility of the resulting polyimide resin in an organic solvent.

Specific examples of the tetracarboxylic acid component include aromatic tetracarboxylic acids such as 3,3',4,4'-biphenyltetracarboxylic acid, 2,3,3',4biphenyltetracarboxylicacid, bis(3,4-dicarboxyphenyl) ether, 3,3',4,4'-benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2-bis (3,4-dicarboxyphenyl)propane, bis(3,4-dicarboxyphenyl)dimethylsilane, bis(3,4-dicarboxyphenyl)diphenylsilane, 2,3,4,5-pyridinetetracarboxylic acid and 2,6-bis(3,4-dicarboxyphenyl)pyridine, and dianhydrides thereof and dicarboxylic acid diacid halides thereof; alicyclic tetracarboxylic acids such as cyclobutane tetracarboxlic acid, cyclopentane tetracarboxylic acid, cyclohexane tetracarboxylic acid, 1,3,5-tricarboxycyclopentyl acetic acid and 3,4-dicarboxy-1,2,3,4-tetrahydro-1-naphthalene succinic acid, and dianhydrides thereof and dicarboxylic acid diacid halides thereof; and aliphatic tetracarboxylic acids such as butane tetracarboxylic acid, and dianhydrides thereof and dicarboxylic acid diacid halides thereof. Among them, 3,4-dicarboxy-1,2,3,4-tetrahydro-1-naphthalene succinic dianhydride is particularly preferred.

These tetracarboxylic acid components may be mixed alone or in combination as a mixture of two or more of them.

The diamine component to be used in the present invention, is a primary diamine commonly used for the synthesis of a polyimide and is not particularly limited.

Specific examples of such a diamine component include aromatic diamines such as diaminodiphenylmethane, diaminodiphenyl ether, 2,2-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane; alicyclic diamines such as bis(4-aminocyclohexyl)methane and bis(4-amino-3methylcyclohexyl)methane; and aliphatic diamines such as tetramethylene diamine and hexamethylene diamine.

Further, a diaminosiloxane of the formula:

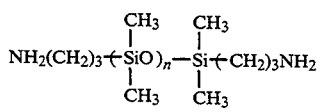

wherein n is an integer of from 1 to 10, may be mentioned.

These diamine components may be used alone or in combination as a mixture of two or more of them.

Further, in order to further improve the excellent stability and durability of alignment as one of the objects of the present invention, it is preferred to use as the diamine component at least one member selected from the group consisting of:

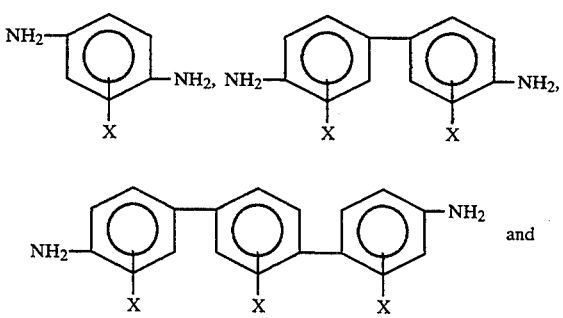

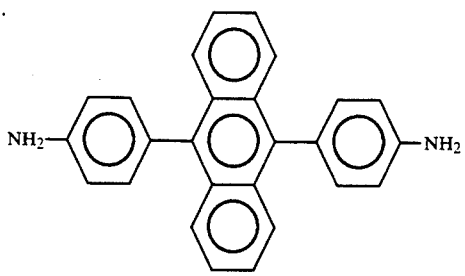

wherein X is a hydrogen atom, an alkyl group, an acyl group, an alkoxy group or a halogen atom.

The proportion of the above diamine component in the total amount of the diamine component is usually at least 10 mol %, preferably at least 20 mol %, more preferably at least 50 mol %.

Specific examples of such a diamine component include aromatic diamines such as p-phenylenediamine, 2,5-diaminotoluene, 4,4′-diaminobiphenyl, 3,3′-dimethyl-4,4′-diaminobiphenyl, 3,3′-dimethoxy-4,4′-diaminobiphenyl, 1,4-bis(4-aminophenyl)benzene and 9,10-bis(4-aminophenyl)anthracene.

These diamine components may be used alone in combination as a mixture of one or more of them.

Specific examples of the monoamine component containing a long chain alkyl group to be used to obtain the polyimide of the present invention, include an aliphatic amine of the following formula (1), an alicyclic amine of the following formula (2) and an aromatic amine of the following formula (3):

NH$_2$—R (1)

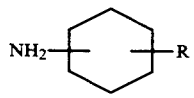
(2)

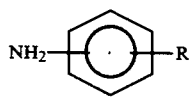
(3)

wherein R is a C$_{8-22}$ linear alkyl, alkyloxy or alkyloxymethylene group.

These monoamine components may be used alone or in combination as a mixture of two or more of them.

Specific examples of the dicarboxylic acid component containing a long chain alkyl group, to be used to obtain the polyimide of the present invention, include an aliphatic dicarboxylic acid of the following formula (4) and its acid anhydride and its acid halide, an alicyclic dicarboxylic acid of the formula (5) and its acid anhydride and its acid halide, and an aromatic dicarboxylic acid of the formula (6) and its acid anhydride and its acid halide:

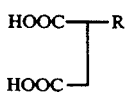
(4)

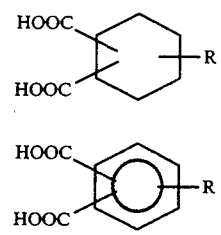
(5)

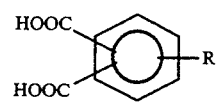
(6)

wherein R is a C$_{8-22}$ linear alkyl, alkyloxy or alkyloxy methylene group.

These dicarboxylic acid components may be used alone or in combination as a mixture of two or more of them.

The tetracarboxylic acid component, and the diamine component and the dicarboxylic acid component containing a long chain alkyl group and/or the monoamine component containing a long chain alkyl group, are reacted and polymerized to obtain a polyamic acid, which is then imide-formed by dehydration ring closure. As the tetracarboxylic acid component and the dicarboxylic acid component to be used here, it is common to employ carboxylic anhydrides. The ratio of the total molar amount of the tetracarboxylic dianhydrides and the total molar amount of the diamines, is preferably from 0.8 to 1.2. Like a usual polycondensation reaction, the closer the molar ratio to 1, the larger the polymerization degree of the resulting polymer. If the degree of polymerization is too small, the strength of the polyimide resin film will be inadequate when it is used as an alignment film, whereby alignment of liquid crystal molecules will be unstable. On the other hand, if the degree of polymerization is too large, the operation efficiency during the formation of the polyimide resin film is likely to be poor.

Accordingly, the polymerization degree of the product in the reaction is preferably from 0.05 to 3.0 dl/g as calculated as a reduced viscosity of the solution (as measured at a concentration of 0.5 g/dl in N-methylpyrrolidone at a temperature of 30° C.).

Further, when the dicarboxylic anhydride containing a long chain alkyl group is reacted, the ratio (a/b) of the total molar amount a of carboxylic acid residues of the tetracarboxylic acid component and the dicarboxylic acid component to the total molar amount b of amine residues of the diamine component, is preferably at most 2. The ratio (a′/b′) of the total molar amount a′ of carboxylic acid residues of the tetracarboxylic acid component to the total molar amount b′ of amine residues of the diamine component and the monoamine component, is preferably at least 2.

If the molar ratio of a/b is larger than 2, or if the molar ratio of a′/b′ is smaller than 2, the reaction of the dicarboxylic acid component or the monoamine component tends to be inadequate when a polyimide precursor is prepared and then imide-formed by dehydration ring closure, whereby when used as an agent for alignment treatment of liquid crystal, the product is likely to adversely affect the properties of the liquid crystal cell.

There is no particular restriction as to the method of reacting and polymerizing the tetracarboxylic dianhydride with the diamine and the dicarboxylic anhydride containing a long-chain alkyl group and/or the monoamine containing a long chain alkyl group. It is common to employ a method wherein the diamine is dissolved in an organic polar solvent such as N-methylpyrrolidone, N,N-dimethylacetamide or N,N-dimethylformamide, then the tetracarboxylic dianhydride is added to this solution and reacted to obtain a polyamic acid, and further the dicarboxylic anhydride containing a long chain alkyl group and/or the monoamine containing a long chain alkyl group, is reacted thereto, followed by imide-formation by dehydration ring-closure.

The temperature for the reaction of the tetracarboxylic dianhydride with the diamine and the dicarboxylic anhydride containing a long chain alkyl group and/or the monoamine containing a long chain alkyl group, can be selected optionally within a range of from −20° C. to 150° C., preferably from −5° C. to 100° C. The polyimide resin of the present invention has a characteristic that it is soluble in a solvent. Accordingly, the polyamic acid obtained by reacting the tetracarboxylic dianhydride with the diamine and the dicarboxylic anhydride containing a long chain alkyl group and/or the monoamine containing a long chain alkyl group, may be imide-formed directly in the solution.

To convert the polyamic acid to the polyimide resin in the solution, it is common to employ a method of heating for dehydration ring closure. The temperature for ring closure by dehydration under heating can be selected optionally within a range of from 100° C. to 350° C., preferably from 120° C. to 250° C.

As an another method for converting the polyamic acid to the polyimide, it is possible to employ a method of chemically closing the ring by means of a known catalyst for dehydration ring closure.

The polyimide resin solution thus obtained may be used by itself, or the resin may be precipitated in a poor solvent such as methanol or ethanol, isolated and then again dissolved in a suitable solvent to be used in the form of a solution.

The solvent for dissolving the resin again, is not particularly limited so long as it is capable of dissolving the obtained polyimide resin. It may, for example, be 2-pyrrolidone, N-methylpyrrolidone, N-ethylpyrrolidone, N-vinylpyrrolidone, N,N-dimethylacetamide, N,N-dimethylformamide or γ-butylolactone.

Even a solvent which is incapable of dissolving the polyimide resin by itself, may be added to the above solvent within a range not to impair the solubility of the polyimide resin. Such a solvent may, for example, be ethyl cellosolve, butyl cellosolve, ethylcarbitol, butylcarbitol, ethylcarbitol acetate or ethylene glycol.

For the purpose of improving the adhesion of the polyimide resin film to a substrate, it is preferred to incorporate an additive such as a coupling agent to the obtained polyimide resin solution.

A coating film of the polyimide resin can be formed on a substrate by coating the solution on the substrate, followed by evaporating the solvent.

The temperature at that time may be at a level sufficient to evaporate the solvent and may usually be from 80° to 150° C.

In this manner, a polyimide resin film having a thickness of from 200 to 3,000 Å is formed on a transparent substrate made of e.g. glass or plastics film provided with a transparent electrode, and then the polyimide resin layer is subjected to rubbing treatment to obtain a liquid crystal alignment film.

Now, the present invention will be described in further detail with reference to Examples. However, it should be understood that the present invention is by no means restricted to such specific Examples.

EXAMPLE 1

30.0 g (0.1 mol) of 3,4-dicarboxy-1,2,3,4-tetrahydro-1-naphthalene succinic dianhydride (hereinafter referred to simply as TDA) and 36.95 g (0.09 mol) of 2,2-bis[4-(4-aminophenoxy)phenyl]propane (hereinafter referred to simply as BAPP) were reacted in 240 g of N-methyl-2-pyrrolidone (hereinafter referred to simply as NMP) at room temperature for 15 hours, and then 4.83 g (0.02 mol) of N-hexadecylamine was added thereto. The mixture was reacted at room temperature for 15 hours to obtain a polyamic acid intermediate solution.

To 50 g of this polyamic acid intermediate solution, 10.8 g of acetic anhydride and 5.0 g of pyridine as an imide-formation catalyst were added, and the mixture was reacted at 50° C. for 3 hours to obtain a polyimide resin solution. This solution was put into 500 ml of methanol, and the resulting white precipitate was collected by filtration and dried to obtain a white polyimide resin powder. The reduced viscosity $\eta sp/C$ of the obtained polyimide resin was 0.27 dl/g (0.5 wt % NMP solution, 30° C.).

0.6 g of this powder was dissolved in 29.4 g of γ-butylolactone so that the total solid content became 2%. The solution was spin-coated at 3,500 rpm on a glass substrate provided with a transparent electrode and heat-treated at 120° C. for 60 minutes to form a polyimide resin film. This coating film was rubbed with a cloth. A pair of such coating films were assembled with the rubbing directions being in parallel with each other and with a spacer of 50 μm interposed therebetween, and a liquid crystal (ZLI-2293, manufactured by Merck) was injected to obtain a cell of homogeneous alignment.

This cell was rotated between crossed nicols, whereby light and darkness were clearly recognized. Thus, satisfactory alignment in the rubbing direction was confirmed. Further, the tilt angle of this cell was measured by a crystal rotation method and found to be 4.2°.

EXAMPLE 2

30.0 g (0.1 mol) of TDA and 9.73 g (0.09 mol) of p-phenylenediamine (PPD) were reacted in 240 g of N-methyl-2-pyrrolidone (NMP) at room temperature for 15 hours, and then 4.83 g (0.02 mol) of n-hexadecylamine was added thereto. The mixture was reacted at room temperature for 15 hours to obtain a polyamic acid intermediate solution. To 50 g of this polyamic acid intermediate solution, 10.8 g of acetic anhydride and 5.0 g of pyridine as an imide-formation catalyst were added, and the mixture was reacted at 50° C. for 3 hours to obtain a polyimide resin solution. This solution was put into 500 ml of methanol, and the resulting white precipitate was collected by filtration and dried to obtain a white polyimide resin powder. The reduced viscosity $\eta sp/C$ of the obtained polyimide resin was 0.30 dl/g (0.5 wt % NMP solution, 30° C.).

0.6 g of this powder was dissolved in 29.4 g of γ-butylolactone, and a cell was prepared in the same manner as in Example 1. It was rotated between crossed nicols, whereby light and darkness were clearly recognized. Thus, satisfactory alignment in the rubbing direction was confirmed.

Further, the tilt angle of this cell was measured by a crystal rotation method and found to be at least 15° beyond the measurable range. Further, this cell was left to stand in a constant temperature oven at 120° C. for one hour, whereupon the tilt angle was measured in the same manner and found to be 8.1°.

EXAMPLE 3

30.0 g (0.1 mol) of TDA and 10.65 g (0.0985 mol) of PPD were reacted in 240 g of NMP at room temperature for 15 hours, and then 1.00 g (0.03 mol) of p-hexadecyloxyaniline was added thereto. The mixture was reacted at room temperature for 15 hours to obtain a polyamic acid intermediate solution.

To 50 g of this polyamic acid intermediate solution, 10.8 g of acetic anhydride and 5.0 g of pyridine as an imide-formation catalyst were added, and the mixture was reacted at 50° C. for 3 hours to obtain a polyimide resin solution. This solution was put into 500 ml of methanol, and the resulting white precipitate was collected by filtration and dried to obtain a white polyimide resin powder. The reduced viscosity $\eta sp/C$ of the obtained polyimide resin was 0.83 dl/g (0.5 wt % NMP solution, 30° C.).

0.6 g of this powder was dissolved in 29.4 g of $\gamma$-butylolactone, and a cell was prepared in the same manner as in Example 1. It was rotated between crossed nicols, whereby light and darkness were clearly observed. Thus, satisfactory alignment in the rubbing direction was confirmed.

Further, the tilt angle of this cell was measured by a crystal rotation method and found to be at least 15° beyond the measurable range. Further, this cell was left to stand in a constant temperature oven at 120° C. for one hour, whereupon the tilt angle was measured in the same manner and found to be 8.3°.

EXAMPLE 4

30.0 g (0.1 mol) of TDA and 10.65 g (0.0985 mol) of PPD were reacted in 240 g of NMP at room temperature for 15 hours, and then 0.95 g (0.03 mol) of phexadecylaniline was added thereto. The mixture was reacted at room temperature for 15 hours to obtain a polyamic acid intermediate solution.

To 50 g of this polyamic acid intermediate solution, 10.8 g of acetic anhydride and 5.0 g of pyridine as an imide-formation catalyst were added, and the mixture was reacted at 50° C. for 3 hours to obtain a polyimide resin solution. This solution was put into 500 ml of methanol, and the resulting white precipitate was collected by filtration and dried to obtain a white polyimide resin powder. The reduced viscosity $\eta sp/C$ of the obtained polyimide resin was 0.88 dl/g (0.5 wt % NMP solution, 30° C.).

0.6 g of this powder was dissolved in 29.4 g of $\gamma$-butylolactone, and a cell was prepared in the same manner as in Example 1. It was rotated between crossed nicols, whereby light and darkness were clearly observed. Thus, satisfactory alignment in the rubbing direction was confirmed.

Further, the tilt angle of this cell was measured by a crystal rotation method and found to be at least 15° beyond the measurable range. Further, this cell was left to stand in a constant temperature oven at 120° C for one hour, whereupon the tilt angle was measured in the same manner and found to be 9.7°.

COMPARATIVE EXAMPLE 1

41.05 g (0.1 mol) of 2,2-bis[4-(4-aminophenoxy)-phenyl]propane (BAPP) and 30.0 g (0.1 mol) of TDA were reacted in 400 g of NMP at room temperature for 20 hours to obtain a polyamic acid intermediate solution.

To 50 g of this polyamic acid intermediate solution, 10.8 g of acetic anhydride and 5.0 g of pyridine as an imide-formation catalyst were added, and the mixture was reacted at 50° C. for 3 hours to obtain a polyimide resin solution. This solution was put into 500 ml of methanol, and the resulting white precipitate was collected by filtration and dried to obtain a white polyimide resin powder. The reduced viscosity $\eta sp/C$ of the obtained polyimide resin was 1.21 dl/g (0.5 wt % NMP solution, 30° C.).

0.6 9 of this powder was dissolved in 29.4 g of $\gamma$-butylolactone, and a cell was prepared in the same manner as in Example 1. It was rotated between crossed nicols, whereby light and darkness were clearly observed. Thus, satisfactory alignment in the rubbing direction was confirmed. Further, the tilt angle of this cell was measured by a crystal rotation method and found to be 0.4°.

COMPARATIVE EXAMPLE 2

10.81 g (0.1 mol) of PPD and 30.0 g (0.1 mol) of TDA were reacted in 240 g of NMP at room temperature for 20 hours to obtain a polyamic acid intermediate solution.

To 50 g of this polyamic acid intermediate solution, 10.8 g of acetic anhydride and 5.0 g of pyridine as an imide-formation catalyst were added, and the mixture was reacted at 50° C. for 3 hours to obtain a polyimide resin solution. This solution was put into 500 ml of methanol, and the resulting white precipitate was collected by filtration and dried to obtain a white polyimide resin powder. The reduced viscosity $\eta sp/C$ of the obtained polyimide resin was 1.44 dl/g (0.5 wt % NMP solution, 30° C.).

0.6 g of this powder was dissolved in 29.4 g of $\gamma$-butylolactone, and a cell was prepared in the same manner as in Example 1. It was rotated between crossed nicols, whereby light and darkness were clearly observed. Thus, satisfactory alignment in the rubbing direction was confirmed.

Further, the tilt angle of this cell was measured by a crystal rotation method and found to be 1.9°.

According to the present invention, a polyimide resin film can be formed on a transparent substrate such as a color filter having low heat resistance, a glass substrate provided with TFT or a plastic film, without impairing the substrate, and then subjected to rubbing treatment to form a liquid crystal alignment film wherein liquid crystal molecules are uniformly aligned in parallel with one another and the liquid crystal molecules have a stable high tilt angle against the substrate.

We claim:

1. An agent for alignment treatment for a liquid crystal cell, which comprises an organic solvent-soluble polyimide obtained by reacting and polymerizing a tetracarboxylic acid component with a diamine component and a dicarboxylic acid component containing a long chain $C_8$–$C_{22}$ alkyl group, followed by imide-formation.

2. An agent for alignment treatment of a liquid crystal cell, which comprises an organic solvent-soluble polyimide obtained by reacting and polymerizing a tetracarboxylic acid component with a diamine component, a dicarboxylic acid component containing a $C_8$–$C_{22}$ alkyl group, and a monoamine component containing a $C_8$–$C_{22}$ alkyl group, followed by imide-formation.

3. The agent for alignment treatment for a liquid crystal cell according to claim 2, wherein at least 10 mol % of the diamine component is selected from the group consisting of:

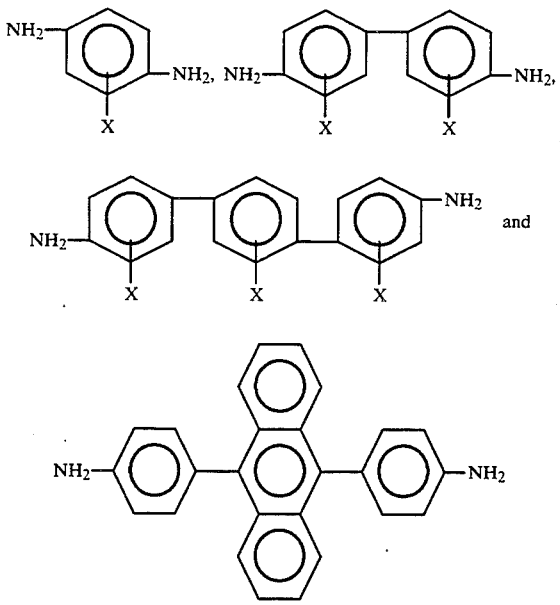

wherein X is a hydrogen atom, a methyl group, a methoxy group or a halogen atom.

4. An organic solvent-soluble polyimide obtained by reacting and polymerizing 3,4-dicarboxy-1,2,3,4-tetrahydro-1-naphthalene succinic dianhydride with a diamine and a further component selected from the group consisting of a monoamine, a dicarboxylic acid, a dicarboxylic acid anhydride, a dicarboxylic acid halide and mixtures thereof sufficiently to form said polyimide, said further component containing a long chain $C_8$–$C_{22}$ alkyl group.

5. The organic solvent-soluble polyimide of claim 4, obtained by polymerizing 3,4-dicarboxy-1,2,3,4-tetrahydro-1-naphthalene succinic dianhydride with said diamine to form a polymer intermediate, reacting said polymer intermediate with said further component to form a polyamic acid, and dehydrating said polyamic acid to provide said polyimide.

6. The organic solvent-soluble polyimide of claim 4, wherein said further component is said monoamine containing a long chain $C_8$–$C_{22}$ alkyl group.

7. The organic solvent-soluble polyimide of claim 4, wherein said 3,4-dicarboxy-1,2,3,4-tetrahydro-1-naphthalene succinic dianhydride and said diamine are present in a ratio of from 0.8 to 1.2.

8. The organic solvent-soluble polyimide of claim 4, wherein said 3,4-dicarboxy-1,2,3,4-tetrahydro-1-naphthalene succinic dianhydride, said diamine and said further component provide total molar amounts of carboxylic acid residues and amine residues, and said total molar amount of carboxylic acid residues is at most two times said total molar amount of amine residues.

9. The agent for alignment treatment of a liquid crystal cell of claim 1 or 2, wherein said tetracarboxylic acid component is a tetracarboxylic acid anhydride.

10. The agent for alignment treatment of a liquid crystal cell of claim 1 or 2, wherein said imide-formation is conducted at a temperature of from 100° to 350° C.

11. The agent for alignment treatment of a liquid crystal cell of claim 1 or 2, wherein said imide-formation is conducted in the presence of a dehydration catalyst.

12. The agent for alignment treatment of a liquid crystal cell of claim 3, wherein at least 20 mol % of said diamine component is selected from said group.

13. The agent for alignment treatment of a liquid crystal cell of claim 12, wherein at least 50 mol % of said diamine component is selected from said group.

14. The agent for alignment treatment for a liquid crystal cell of claim 1 or 2, wherein said dicarboxylic acid component is selected from the group consisting of:

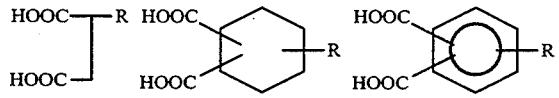

wherein R is said $C_8$–$C_{22}$ alkyl group, and corresponding dicarboxylic acid anhydrides and dicarboxylic acid halides thereof.

15. The agent for alignment treatment for a liquid crystal cell of claim 1 or 2, wherein said polymerizing produces a polymerization degree which results in a reduced viscosity of a 0.5M solution of said polyimide in N-methylpyrrolidone at a temperature of 30° C. of from 0.05 to 3.0 dl/g.

16. The agent for alignment treatment for a liquid crystal cell of claim 1 or 2, further comprising an organic polar solvent.

17. The agent for alignment treatment for a liquid crystal cell of claim 10, wherein said organic polar solvent is selected from the group consisting of N-methylpyrrolidone, N,N-dimethylacetamide, N,N-dimethylformamide and γ-butyrolactone.

* * * * *